(12) United States Patent
Jimenez et al.

(10) Patent No.: US 8,061,715 B2
(45) Date of Patent: Nov. 22, 2011

(54) GLAD HAND FITTING AND GASKET FOR RAILROAD CAR BRAKE HOSE

(75) Inventors: Edgardo Jimenez, Monmouth Junction, NJ (US); Christopher Munn, Fords, NJ (US); Lin Hua, Jersey City, NJ (US)

(73) Assignee: Strato, Inc., Piscataway, NJ (US)

( * ) Notice: Subject to any disclaimer, the term of this patent is extended or adjusted under 35 U.S.C. 154(b) by 346 days.

(21) Appl. No.: 12/405,671

(22) Filed: Mar. 17, 2009

(65) Prior Publication Data
US 2010/0237569 A1 Sep. 23, 2010

(51) Int. Cl.
F16J 15/02 (2006.01)
B60D 1/62 (2006.01)
B61G 5/08 (2006.01)
F16B 23/00 (2006.01)

(52) U.S. Cl. ............ 277/627; 277/644; 285/65; 285/67; 285/374

(58) Field of Classification Search .................. 277/608, 277/630, 637, 641, 642, 644; 285/65–79, 285/99, 352, 374, 376
See application file for complete search history.

(56) References Cited

U.S. PATENT DOCUMENTS

| | | | | |
|---|---|---|---|---|
| 3,245,428 A | | 4/1966 | Klimak et al. | |
| 3,346,263 A | * | 10/1967 | Newcomer | 277/613 |
| 3,369,827 A | * | 2/1968 | Rouillon | 285/68 |
| 3,680,875 A | * | 8/1972 | Hawthorne | 277/613 |
| 3,879,066 A | * | 4/1975 | Kozinski | 285/69 |
| 5,131,667 A | * | 7/1992 | Mong et al. | 277/613 |
| 5,240,311 A | * | 8/1993 | Bunker | 277/609 |
| 5,388,864 A | * | 2/1995 | Kozinski | 285/78 |
| 5,911,444 A | * | 6/1999 | Buchter et al. | 285/69 |
| 5,957,713 A | * | 9/1999 | Engle et al. | 439/195 |
| 5,980,289 A | * | 11/1999 | Engle | 439/195 |
| 6,024,363 A | * | 2/2000 | Johnson, Jr. | 277/613 |
| 6,039,409 A | * | 3/2000 | Engle | 303/7 |
| 6,290,238 B1 | * | 9/2001 | Johnson, Jr. | 277/613 |
| 6,705,478 B1 | * | 3/2004 | Engle | 213/1.3 |
| 7,140,618 B2 | * | 11/2006 | Valls, Jr. | 277/609 |

OTHER PUBLICATIONS

AAR Manual of Standards and Recommended Practices Brakes and Brake Equipment, "Gaskets, Air Hose", Specification M-602, Adopted:1912; Revised 1999, 2002.
AAR Manual of Standards and Recommended Practices Brakes and Brake Equipment, "Hose Coupling Gauges for Gauging New and Used Couplings", Standard S-456; Adopted 1926; Revised: 1999, 2002.

* cited by examiner

*Primary Examiner* — Thomas Beach
*Assistant Examiner* — Nicholas Foster
(74) *Attorney, Agent, or Firm* — Fitzpatrick, Cella, Harper & Scinto

(57) ABSTRACT

A glad hand with an improved gasket for use in the coupling of end hoses in railroad cars. The gasket provides an increased surface area for a wider sealing surface and increased sealing properties for coupling with another gasket on a glad hand.

10 Claims, 3 Drawing Sheets

GLAD HAND FITTING AND GASKET FOR RAILROAD CAR BRAKE HOSE

BACKGROUND OF THE INVENTION

1. Field of the Invention

The invention relates to a modified glad hand and gasket combination for forming an air tight connection between two glad hand coupling members on the ends of air brake hoses for railroad cars. Specifically, the invention relates to an improved glad hand having an improved gasket shape for better alignment and more effective sealing, which in turn reduces unintended decoupling incidents. More particularly, the invention relates to an improved gasket having an increased entrance angle and an increased sealing surface for providing better alignment and sealing during coupling.

2. Description of Related Art

In a conventional railroad train braking system, each railway vehicle is provided with a brake pipe line which extends along the length of the vehicle. The pipe line is connected to the brake cylinders via reservoirs and valves. Each end of the brake pipe is coupled to a "glad hand" connector by an angle or stop cock and a flexible hose. The glad hand connectors are fastened together to form a continuous pipe line stretching from the head locomotive to the last train car. Each flexible hose has a glad hand, acting as a coupling member, at each end for detachably connecting the hose sections of adjacent cars together when joining additional individual railroad cars.

Glad hands are joined by pulling the hoses from adjacent cars upward, pushing the sealing gaskets on the glad hands at the end of each hose into aligned and abutting relationship, and then rotating the coupling members downward which interengages mating flanges and lugs extending from the coupling members. This coupling results in a sealed fluid passage between air hoses on adjacent railroad cars, which maintains the brakes of all of the individual cars in an "off" position. If there is a significant reduction in air pressure within the hose lines, such as in the case of derailment or separation of cars, the brakes move into the "on" position. Any accidental separation of the coupling between two air hoses causes an emergency braking of the train cars and resulting disruption to train service. It is important to avoid such stoppages for both safety and economy.

Couplings between the air hoses are often difficult to properly align. If they are not properly aligned, there will not be an air tight seal, as there is supposed to be, which leads to leaks or a failed seal. Even when the couplings are properly aligned, the seal created by the gaskets must be able to withstand upwards of 90 p.s.i. during operation. It is a well-known problem that the current gasket designs sometimes fail to maintain the pneumatic pressure, which results in leaks either slowly or rapidly leading to emergency brake activation. There is a prevalent problem regarding gasket alignment between the two adjacent coupling members. Such alignment is crucial in obtaining a proper seal to withstand the pressure during operation.

The components of the railroad train are designed and manufactured to meet the requirements of the Association of American Railroads ("AAR") and are generally similar. Two sections of the "AAR Manual of Standards and Recommended Practices; Brakes and Brake Equipment" set standards for glad hand connectors and sealing gaskets: Standard S-456 and Specification M-602. Standard S-456 sets forth the dimensions for the standard gasket in FIG. 6.1, depicting a gasket with a surface area of 0.659 in$^2$. Specification M-602 sets forth additional dimensions for the standard gasket in FIG. 4.1, and further illustrates an angled edge at an angle of 45° with the center line of the gasket.

U.S. Pat. No. 6,290,238 discloses a gasket for use in detachably connecting two similar coupling members on the ends of air brake hoses for railroad cars. The gasket disclosed therein provides a ramped entrance angle, two outward projections, and a wide sealing surface for providing alignment and sealing. However, in that design, a channel is formed in the gasket, which engages a protrusion on the glad hand. The thin portion of the gasket outside the protrusion bears against the glad hand fitting and is easily worn and damaged.

Despite the progress that has been made in gaskets design, the prior art does not provide an adequate solution to the problem of misalignment of coupled air brake hoses and improper sealing.

The invention disclosed herein addresses the need for a glad hand and gasket combination having a self-aligning feature and an expanded sealing surface to improve the reliability of end hose coupling.

SUMMARY OF THE INVENTION

It is an object of the present invention to provide an improved glad hand and gasket for end hose coupling.

A further object of the invention is to provide an improved gasket that more effectively aligns with the outer surface of the opposing gasket on a opposing glad hand, and which resists misalignment when subjected to pressure on the outer surface.

A still further object of the invention is to provide an improved glad hand with a gasket having an increased entrance angle, which in turn allows for a larger facing surface and for improved seating of the gasket within the glad hand fitting.

Another object of the invention is to provide a gasket with increased surface area to increase the resistance to decoupling, thereby reducing emergency brake application incidents.

Another object of the invention is to provide a glad hand and gasket combination having a prolonged life, by virtue of the modified design over the prior art.

These and other objects of the invention are achieved with a novel glad hand and gasket combination, comprising, in preferred embodiments: a unitary annular gasket having a bore through the center, a flat annular outer surface, an inner surface having a rib, and a side having a lip. The bore has a vertical planar sidewall surface meeting an angled edge extending from the bore sidewall surface to the rib on the inner surface, forming one side of the rib. The rib has a second angled surface opposite the angled edge and extending toward the perimeter of the gasket. A lip, which is received into a groove in the gasket, extends from the rib to the perimeter of the gasket, and from the perimeter of the gasket to a vertical surface on the side of the gasket, which is perpendicular to, and which meets, the flat outer surface.

A glad hand fitting adapted to receive the gasket has an opening which is wider than conventionally used in such fittings, and a groove adapted to receive the lip. A stepped portion inside of the groove has a bearing surface perpendicular to the center line of the gasket which abuts the rib of the gasket.

This design maximizes the area of the outer surface without sacrificing integrity and stability, because the sides of the gasket extend vertically away from the outer surface to meet the lip. The placement of the rib with respect to the outer surface provides for a more even distribution of force when pressure is applied to the outer surface of the gasket.

DETAILED DESCRIPTION OF THE PREFERRED EMBODIMENTS

Figure 1:
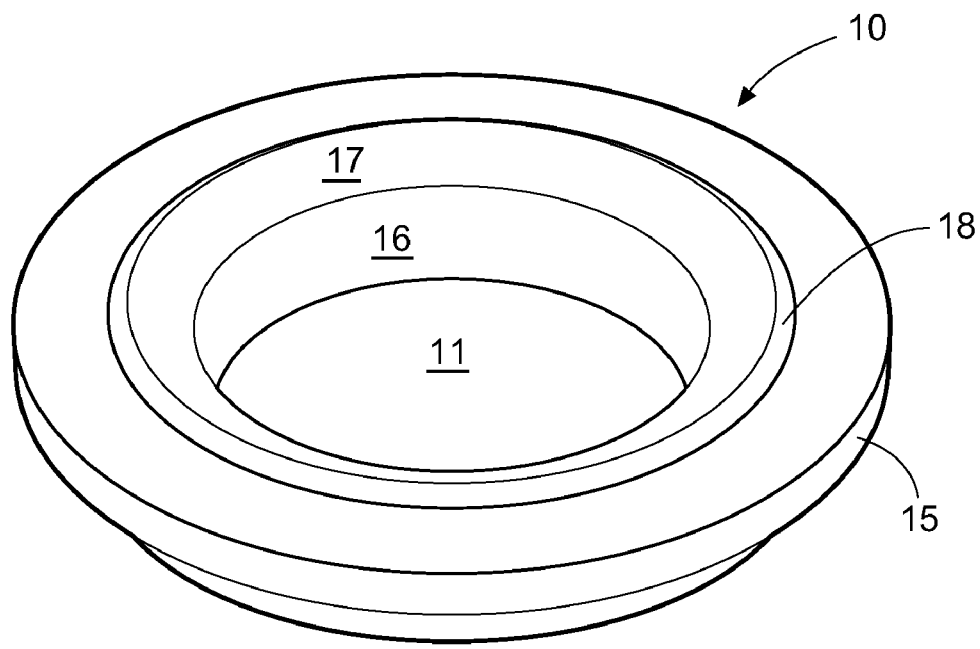
FIG. 1 is a perspective view of a gasket according to the invention.
Figure 2:
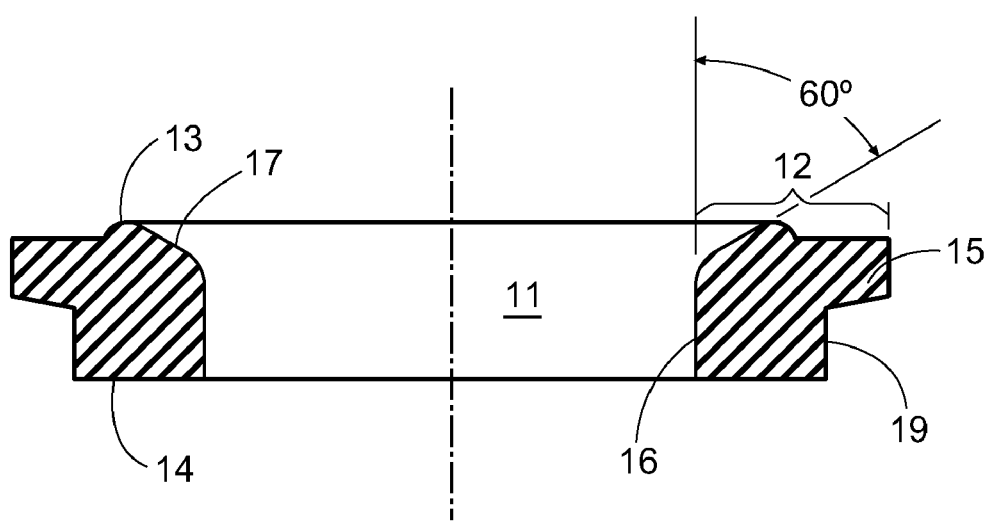
FIG. 2 is a cross-sectional view of the gasket.
Figure 3:
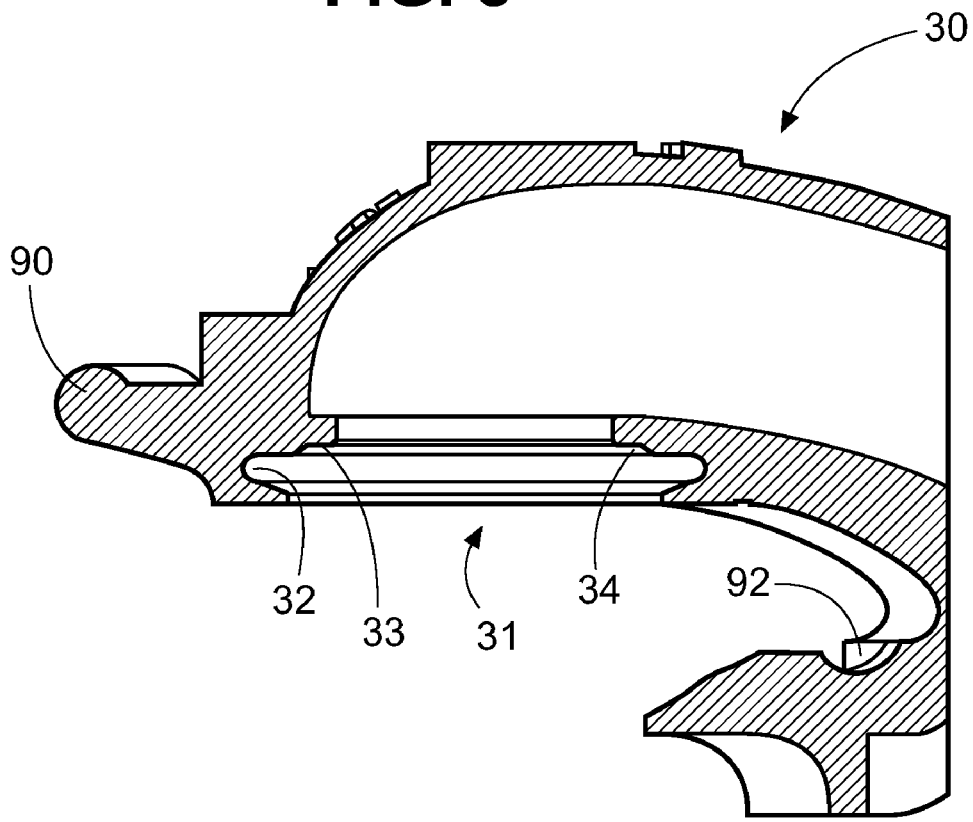
FIG. 3 is a cross sectional view of the glad hand portion of the combination.

FIG. 1 through FIG. 3 depict the improved glad hand and gasket of the present invention. As is well known in the art, hoses are coupled together in series by coupling two glad hands together to form an air tight passageway from one member to the other. Conventional coupling features of the glad hand include locking flanges 90 and cooperating grooves 92, as shown in FIG. 3, which are rotated to form a mating contact which puts pressure on the facing surface of the gasket. These elements, described for example in U.S. Pat. Nos. 3,879,066 and 5,388,864, which are incorporated herein by reference, are known per se and will not be elaborated upon herein.

As seen in the perspective view of FIG. 1, a preferred embodiment of the gasket and glad hand combination of the present invention includes a unitary annular element (or simply "gasket") 10 having a bore 11 through its center. The bore 11 has a center line, which is also the center line of the gasket. As used herein, "vertical" means parallel to the centerline of the gasket. The gasket 10 has an inner surface 12, having a rib 13, a flat annular outer surface 14 (not visible in the perspective view of FIG. 1), which faces and presses against a similar annular surface on an adjacent glad hand. As used herein "outer" means a direction toward the opening in the fitting or hose. "Inner" means the opposite direction, toward the inside of the fitting or hose. The gasket also has a side peripheral surface having a lip 15 received in a groove in the glad hand. "Peripheral" and "perimeter" refer to the sides of the gasket located in a radial direction away from the centerline. "Above" and "below" are sometimes used herein to refer to the orientation of the gasket shown in FIG. 2. Thus, the inner surface having a rib may be described as "above" the flat annular outer surface 14.

The bore has a vertical planar sidewall surface 16 which meets an angled edge 17 of the gasket. The angled edge 17 extends from the bore sidewall surface to the rib and forms a side of the rib 13. A second angled surface 18 forms the opposite side of the rib.

The lip 15 extends from the rib 13 to the side perimeter of the gasket, and from the perimeter of the gasket to a vertical surface 19 on the side of the gasket. Surface 19 is perpendicular to and meets the flat outer surface 14. It is a feature of preferred embodiments of the present invention that the side of the gasket between the lip 15 and the flat outer surface 14 is a straight vertical line. This bore sidewall surface 16 and side surface 19 are substantially parallel from the annular outer surface 14 to the lip 15, so that the annular outer surface has the maximum amount of support. In the preferred embodiment depicted in FIG. 2, the bottom of lip 15 is sloped.

In a preferred embodiment, the angle formed between the center line and the angled surface is greater than about 45 degrees, preferably greater than about 55 degrees and most preferably about 60 degrees. The larger entrance angle employed with the gasket according to the invention serves to place the top of rib 13 farther away from the bore sidewall surface 16 in a direction toward the side of the gasket. Consequently, the rib 13 is more centrally located with respect to the opposing annular surface 14. Thus, force applied when adjacent glad hands are pressed together is more evenly distributed. The rib may be referred to as being "inboard" of the bore sidewall. Inboard means in a radial direction away from the bore side wall, or in a radial direction away from the peripheral surface of the gasket, as the case may be.

In the most preferred embodiments, as best seen in FIG. 2, the rib 13 is vertically above the flat annular outside surface 14 at approximately the midpoint of the surface 14.

In order to increase the surface area of the outer annular surface, the glad hand fitting is formed with a wider opening than conventionally employed in the prior art. The outer annular surface has an area of at least about 0.850 square inch, preferably equal to or greater than about 1.400 square inch. A larger outer annular surface supported by parallel sides as described above can only be obtained if the opening of the glad hand fitting is enlarged.

In FIG. 3, glad hand fitting 30 is shown adapted to receive the gasket, having an opening 31, a groove 32 adapted to receive the lip 15, and a stepped portion 33 inside of the groove. The stepped portion comprises a bearing surface 34 perpendicular to the center line of the gasket which abuts the rib of the gasket. In the prior art, the surface 34' has always been curved, as shown in FIG. 5.

In a specific embodiment, gasket 10 may be designed as follows: the bore 11 is 1.1875 inches wide; the diameter across gasket 10 at the outer surface 14 is nominally 1.812 inches and ranges from 1.796 inches to 1.827 inches; the diameter across gasket 10 at the widest point, to the edges of lip 15 is nominally 2.124 inches and ranges from 2.108 inches to 2.140 inches; the diameter across the gasket 10 at rib 13 is nominally 1.554 inches and ranges from 1.544 inches to 1.564 inches; the height of gasket 10 from outer surface 14 to inner surface 12 at the bottom of the rib is nominally 0.343 inches and ranges from 0.341 inch to 0.354 inch; the height of gasket 10 from outer surface 14 to the top of rib 13 is nominally 0.382 inch and ranges from 0.372 inch to 0.392 inch; and the height of lip at the peripheral surface is nominally 0.140 inches and ranges from 0.135 inches to 0.145 inches. AAR standards permit certain tolerances in dimensions, and all dimensions recited herein, whether or not modified by the word "about," should be understood to encompass these tolerances.

Figure 4:
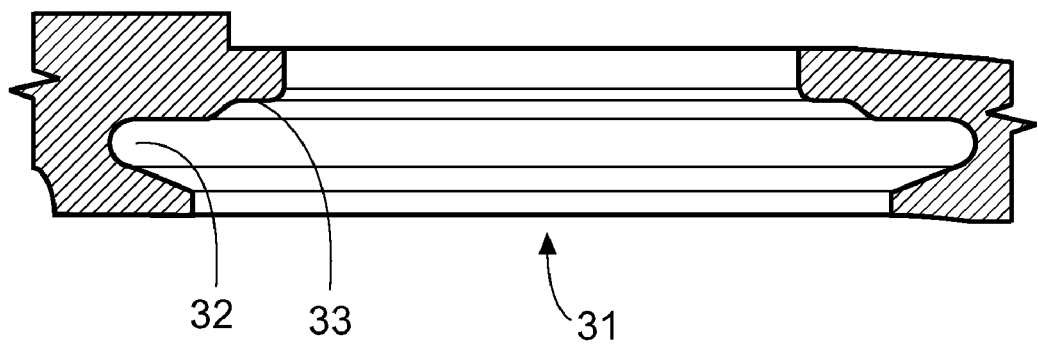
FIG. 4 is a cross sectional detail of the glad hand, showing the opening for receiving the gasket.
Figure 5:
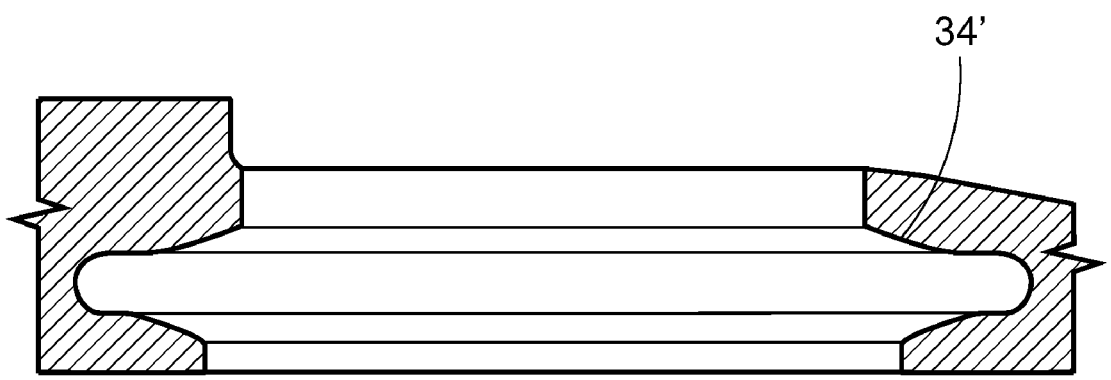
FIG. 5 is a detail view depicting a conventional glad hand fitting according to the prior art.

FIG. 5 shows a conventional glad hand fitting of the prior art, meeting the standards of Standard S-456, as depicted in FIG. 6.1 therein, where the recess for the gasket is provided with a bearing surface having a radius of ⅝ inches. In contrast, the recess 33 of the present invention, as shown in FIG. 4, has a bearing surface 34 is approximately perpendicular to the center line of the gasket, where approximately perpendicular is defined as having a radius of less than ⅝ inch, preferably less than ¼ in and most preferably being a straight line.

As a result of the structural changes to the gasket identified herein, the present invention is able to obtain a sealing surface area over two times that of the prior art. Specifically, the surface area of the improved gasket of the present invention is approximately 1.470 in² based upon the above example. In contrast, the same example without the improved angle of the angled edge would have a surface area of 0.659 in². This significant increase in surface area directly results in improved coupling and therefore, improved sealing.

The gasket 10 may be made from any material capable of forming a seal, however, preferably, it is molded, or otherwise fabricated, from an elastomeric polymer, such as butadiene rubber. In a preferred embodiment, the material used to make the gasket includes an ozone inhibitor, and further, the rubber is a softer rubber.

The gasket disclosed herein is designed for use in air brake hose coupling members where adjacent gaskets in glad hands are compressed against each other outer surface 16 to outer surface to form a seal capable of holding under pneumatic pressures ranging from 60 to 90 or more p.s.i.

In operation, the gasket, when installed, flexes sufficiently such that lip 15 is received into groove 32. Once gasket 10 is inserted far enough into opening 31 that lip 15 is aligned with groove, the sloped bottom allows the members to work into the groove to form a tight seal between gasket 10 and the glad hand fitting 30, sufficient to stand at least 90 p.s.i.

When two adjacent train cars have been coupled, the air brake hose lines of the adjacent cars must also be coupled. Hose sections (not shown) extend outwardly from the ends of adjacent railroad cars, and are connected to the appropriate air lines and associated brake equipment mounted on the cars. The glad hand 30 is attached to the end of each of the hoses and is located generally under the mechanical coupler mechanism of the railroad car so that a trainman can easily grasp members 30 which are supported by a separate chain or other device connected to the train car to provide support. In a usual air brake hose coupling procedure, a trainman will grasp a pair of adjacent coupling members 30, one in each hand, and bend the hose ends upwardly and toward each other so that they are in an aligned position. The glad hands are then moved together, bringing gaskets 10 into an abutting compressed relationship with respect to each other.

Whereas Standard S-456 recites a gasket with surface area of 0.659 in², the improved gasket of the present invention has a surface area of 1.470 in². Additionally, whereas Specification M-602 sets forth an angled edge at an angle of 45° with the center line of the gasket, the improved gasket of the present invention has an angle of greater than 45°.

The improved gasket for use with an air brake hose coupling member as described above is simplified, and provides an effective, safe, inexpensive, and efficient device which achieves all the enumerated objectives, provides for eliminating difficulties encountered with prior devices, and solves problems and obtains new results in the art.

The foregoing description and illustration of the invention is intended to as an example, and the scope of the invention is not limited to the exact details shown or described. One of ordinary skill in the art would be able to accomplish the invention in other ways.

What is claimed is:

1. A glad hand and gasket combination, comprising:
   a unitary annular gasket having a bore through the center, a flat annular outer surface, an inner surface having a rib, and a side having a lip;
   the bore having a vertical planar sidewall surface; said sidewall surface meeting an angled edge extending from said bore sidewall surface to the rib; the rib having a second angled surface opposite said angled edge and extending toward the perimeter of the gasket; the lip extending from the rib to the perimeter of the gasket, and from the perimeter of the gasket to a vertical surface on the side of the gasket, which is perpendicular to and which meets, the flat annular outer surface;
   a glad hand fitting adapted to receive the gasket, having an opening, a groove adapted to receive said lip, and a stepped portion inside of said groove; the stepped portion having a bearing surface approximately perpendicular to the center line of the gasket abutting the rib of the gasket;
   wherein the bore sidewall surface and the vertical surface on the side of the gasket are parallel to each other from the outer annular surface to the lip.

2. A glad hand and gasket combination according to claim 1, wherein said angled edge forms an angle greater than 45° with the center line of the gasket.

3. A glad hand and gasket combination according to claim 1, wherein said angled edge forms an angle greater than 55° with the center line of the gasket.

4. A glad hand and gasket combination according to claim 1, wherein said angled edge forms an angle of about 60° with the center line of the gasket.

5. The glad hand and gasket combination according to claim 1, wherein the second angled surface meets the lip at a point that is inboard of the vertical surface on the side of the gasket that is perpendicular to and meets the flat annular surface.

6. The glad hand and gasket combination according to claim 1, wherein the rib is vertically above the flat annular outside surface at approximately the midpoint of the surface.

7. The glad hand and gasket combination according to claim 1, wherein the bore sidewall surface and a side peripheral surface of the gasket are perpendicular to and meet the outer annular surface, and the outer annular surface has an area of at least about 0.850 square inch.

8. The glad hand and gasket combination according to claim 1, wherein the bore sidewall surface and a side peripheral surface of the gasket are perpendicular to and meet the outer annular surface, and the outer annular surface has an area of at least about 1.400 square inches.

9. A glad hand and gasket combination, comprising:
   a unitary annular gasket having a bore through the center, a flat annular outer surface, an inner surface having a rib, and a side having a lip;
   the bore having a vertical planar sidewall surface; said sidewall surface meeting an angled edge extending from said bore sidewall surface to the rib; the rib having a second angled surface opposite said angled edge and extending toward the perimeter of the gasket; the lip extending from the rib to the perimeter of the gasket, and from the perimeter of the gasket to a vertical surface on the side of the gasket, which is perpendicular to and which meets, the flat annular outer surface;
   a glad hand fitting adapted to receive the gasket, having an opening, and a groove adapted to receive said lip;
   wherein the bore sidewall surface and the vertical surface on the side of the gasket are parallel to each other from the outer annular surface to the lip, and a stepped portion inside of said groove; the stepped portion having a bearing surface approximately perpendicular to the center line of the gasket abutting the rib of the gasket; and
   wherein the outer annular surface has an area of at least about 0.850 square inch.

10. The glad hand and gasket combination of claim 9, wherein the outer annular surface has an area of at least about 1.400 square inches.

* * * * *